(12) United States Patent
De Jager et al.

(10) Patent No.: US 11,965,288 B2
(45) Date of Patent: Apr. 23, 2024

(54) ROPE HAVING AN END CONNECTOR SEGMENT COMPRISING TWO ROPE-BRANCHES FOR MAKING NOOSED CONNECTIONS

(71) Applicant: Lankhorst Touwfabrieken B.V., Sneek (NL)

(72) Inventors: Pieter De Jager, Sliedrecht (NL); Ricky Norman Daly, Helensvale (AU); Adrianus Stout, Alblasserdam (NL)

(73) Assignee: Lankhorst Touwfabrieken B. V., Sneek (NL)

( * ) Notice: Subject to any disclaimer, the term of this patent is extended or adjusted under 35 U.S.C. 154(b) by 246 days.

(21) Appl. No.: 17/595,604

(22) PCT Filed: Feb. 24, 2020

(86) PCT No.: PCT/NL2020/050115
§ 371 (c)(1),
(2) Date: Nov. 19, 2021

(87) PCT Pub. No.: WO2020/235994
PCT Pub. Date: Nov. 26, 2020

(65) Prior Publication Data
US 2022/0228316 A1 Jul. 21, 2022

(30) Foreign Application Priority Data
May 21, 2019 (EP) .................................... 19175724

(51) Int. Cl.
*D07B 5/00* (2006.01)
(52) U.S. Cl.
CPC ...... *D07B 5/005* (2013.01); *D07B 2201/1004* (2013.01)

(58) Field of Classification Search
CPC . D07B 5/005; D07B 2201/1004; D07B 1/185
See application file for complete search history.

(56) References Cited

U.S. PATENT DOCUMENTS

| | | | | |
|---|---|---|---|---|
| 195,024 A | * | 9/1877 | Knox ...................... | A62B 1/20 261/114.1 |
| 869,285 A | | 10/1907 | Wilson | |

(Continued)

FOREIGN PATENT DOCUMENTS

| | | |
|---|---|---|
| AU | 710462 | 10/1998 |
| DE | 2123977 A1 | 11/1972 |

(Continued)

OTHER PUBLICATIONS

International Search Report for corresponding International Application No. PCT/NL2020/050115 dated Jun. 4, 2020, 3 pages.

*Primary Examiner* — Bao-Thieu L Nguyen
(74) *Attorney, Agent, or Firm* — Pearne & Gordon LLP

(57) ABSTRACT

A rope (1) according to the invention comprises a main rope segment (4), a branching position (5) and an end connector segment (6), wherein the end connector segment comprises a first rope-branch (11) and a second rope-branch (12). The first rope-branch (11) comprises a noosed first rope-branch portion (21N) for making a noosed connection with a thickened rope portion, or a thickened first rope-branch portion for making a noosed connection with a noosed rope portion. The second rope-branch (12) comprises a noosed second rope-branch portion for making a noosed connection with a thickened rope portion, or a thickened second rope-branch portion (22T) for making a noosed connection with a noosed rope portion. The rope according to the invention allows for many various favourable manners of connecting the rope to other ropes and/or to other types of external objects.

30 Claims, 12 Drawing Sheets

(56) References Cited

U.S. PATENT DOCUMENTS

| | | | |
|---|---|---|---|
| 901,155 A | 10/1908 | Dahms | |
| 1,386,052 A * | 8/1921 | Duggan | B60D 1/187 |
| | | | 280/480 |
| 1,924,992 A * | 8/1933 | Jasper | B60D 1/18 |
| | | | 280/480 |
| 2,947,504 A * | 8/1960 | Ruhlman | H01B 17/22 |
| | | | 174/DIG. 12 |
| 3,397,026 A | 8/1968 | Spina | |
| 3,718,947 A * | 3/1973 | Huber | B66C 1/14 |
| | | | 24/298 |
| 4,036,101 A * | 7/1977 | Burnett | F16G 11/14 |
| | | | 87/8 |
| 4,405,034 A * | 9/1983 | Dunne | B63B 27/14 |
| | | | 182/100 |
| 4,825,796 A * | 5/1989 | Worthington | F16G 11/14 |
| | | | 188/65.1 |
| 4,890,363 A * | 1/1990 | Cross | F16L 55/005 |
| | | | 24/298 |
| 5,083,875 A * | 1/1992 | Cedrone | G02B 6/545 |
| | | | 385/139 |
| 7,399,018 B1 * | 7/2008 | Khachaturian | D07B 1/185 |
| | | | 294/74 |
| 8,443,471 B2 * | 5/2013 | McCurdy | D07B 1/02 |
| | | | 5/120 |
| 9,314,241 B2 * | 4/2016 | Stone | A61B 17/0401 |
| 11,485,180 B2 * | 11/2022 | Najarro | D07B 1/02 |
| 11,504,556 B2 * | 11/2022 | Power, II | A01M 31/02 |
| 2014/0137388 A1 | 5/2014 | Campbell et al. | |
| 2016/0097156 A1 * | 4/2016 | Gallon | D07B 1/18 |
| | | | 87/8 |
| 2019/0210696 A1 * | 7/2019 | Barnes | D07B 1/16 |
| 2020/0130439 A1 * | 4/2020 | Najarro | B60D 1/52 |
| 2021/0086873 A1 * | 3/2021 | Barnes | D07B 5/005 |
| 2022/0081832 A1 * | 3/2022 | De Jager | F16G 15/06 |
| 2022/0178074 A1 * | 6/2022 | Pavel | D07B 1/185 |
| 2023/0024630 A1 * | 1/2023 | Kennelly | B66D 1/28 |

FOREIGN PATENT DOCUMENTS

| | | |
|---|---|---|
| DE | 202014104912 | 1/2015 |
| WO | 2012/150469 A2 | 11/2012 |

* cited by examiner

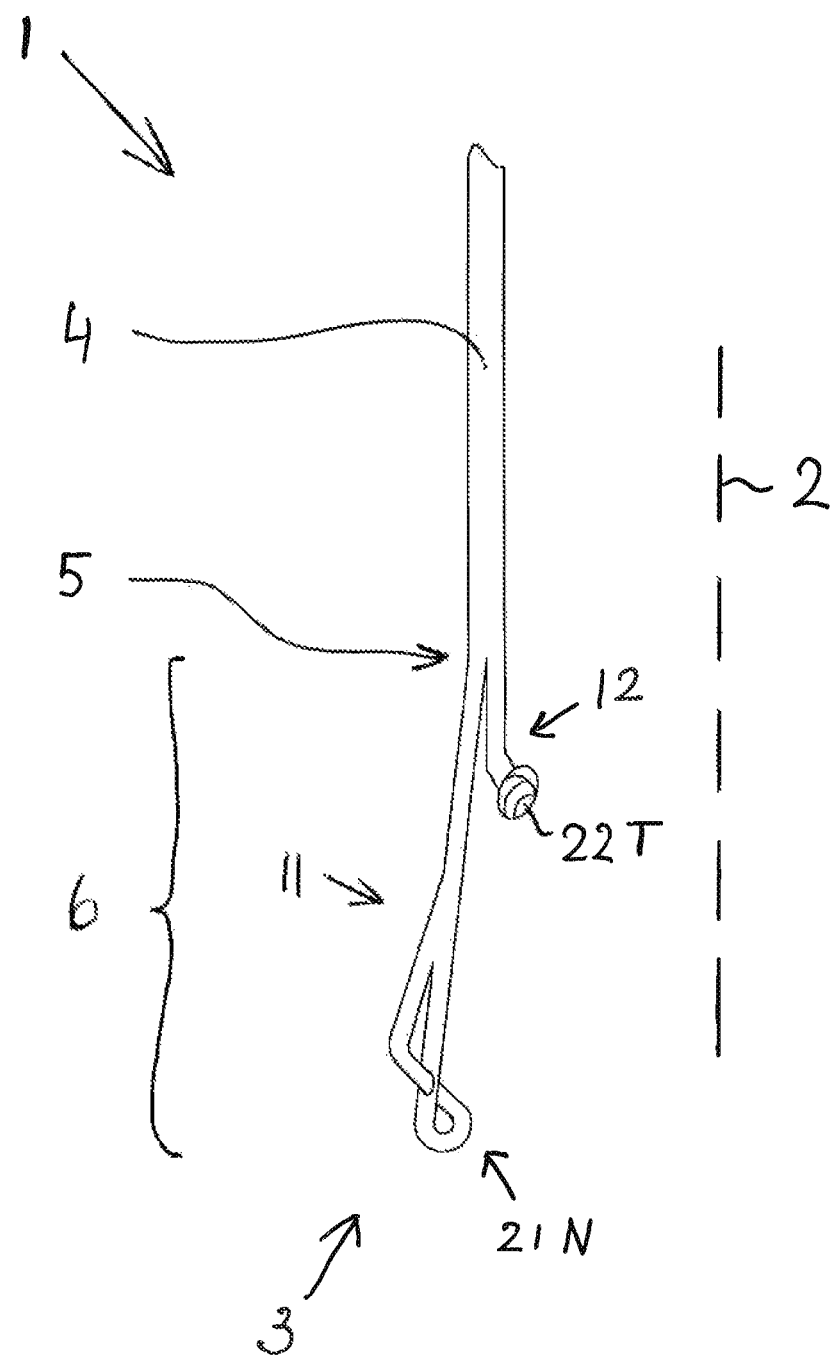

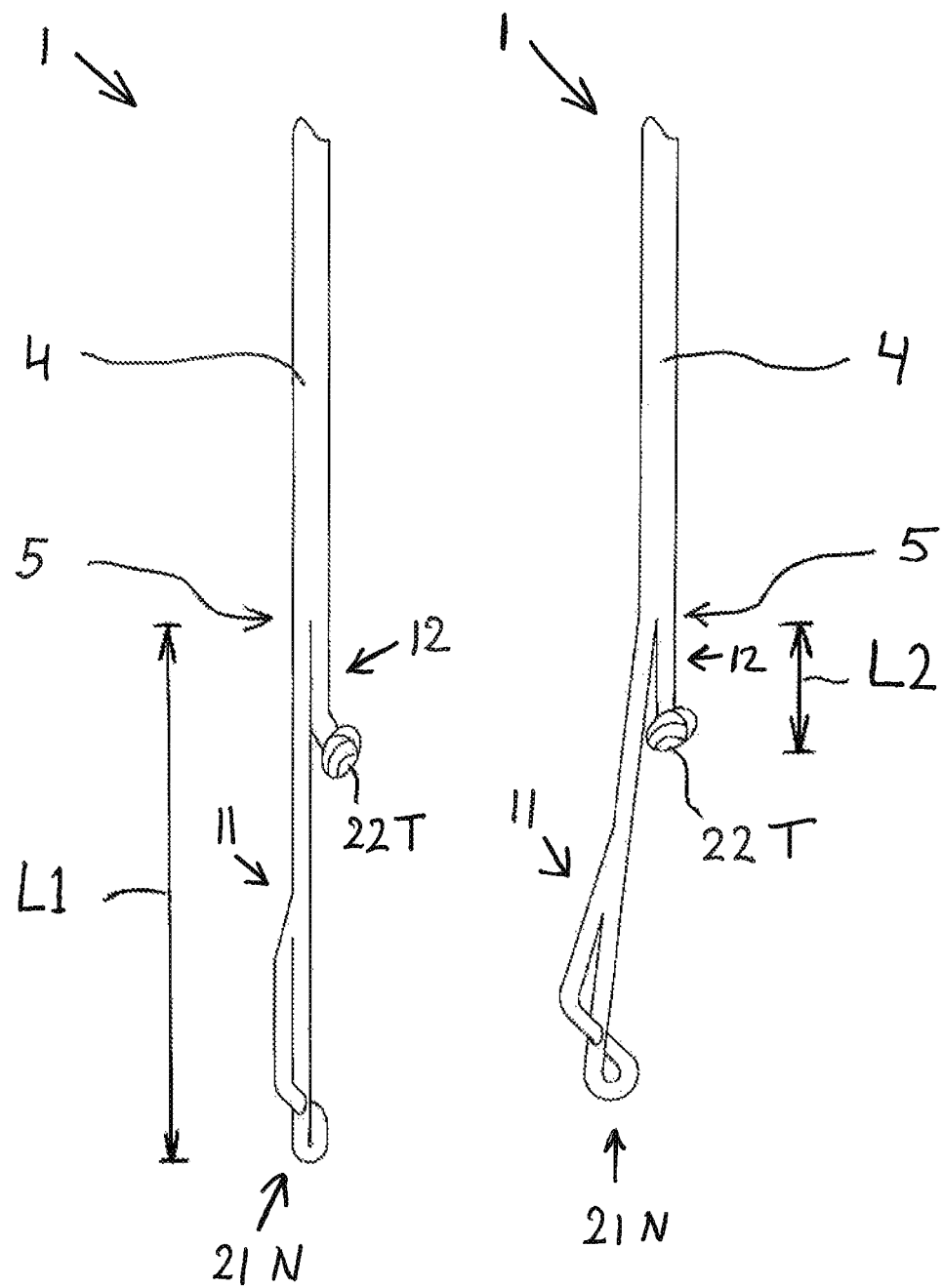

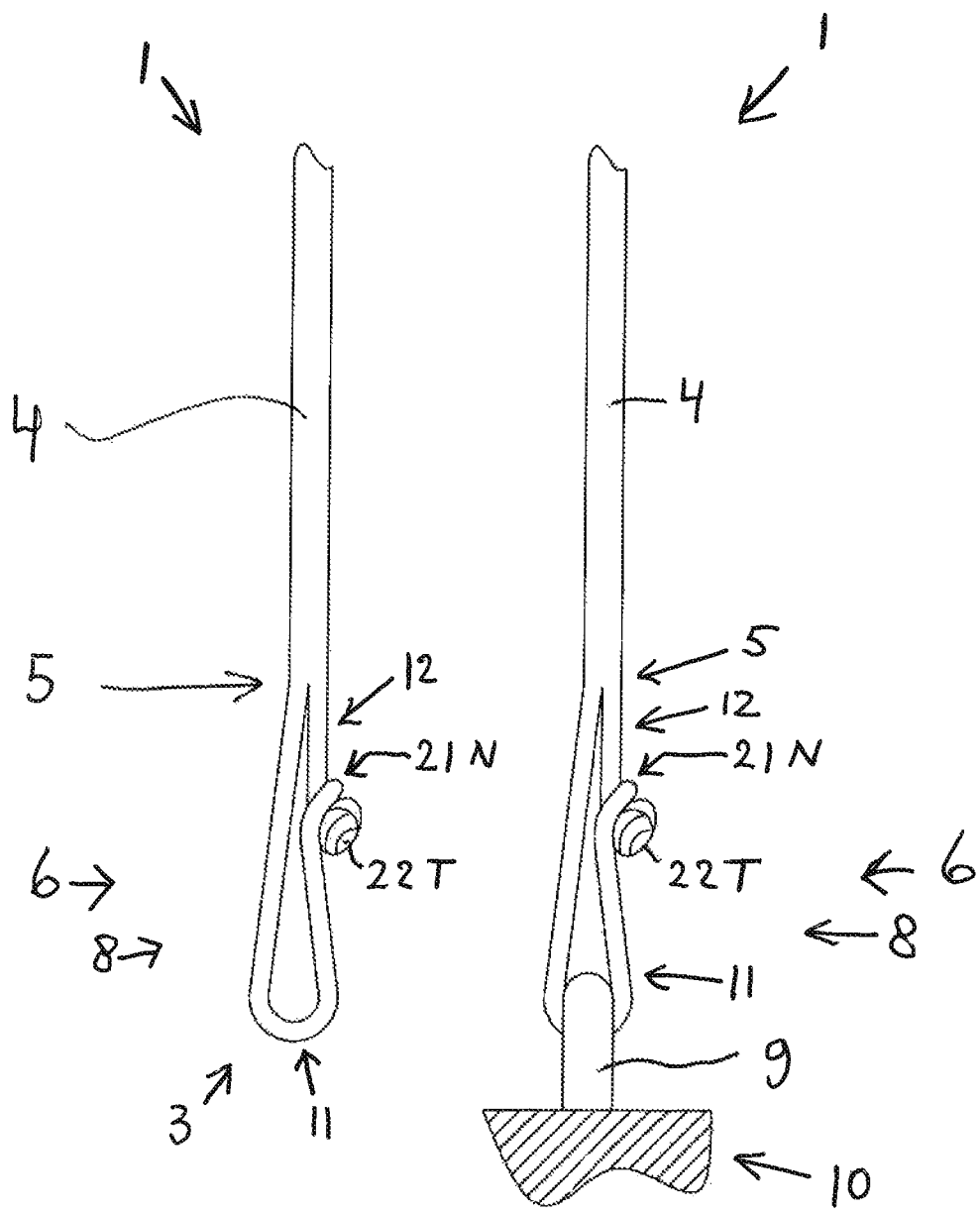

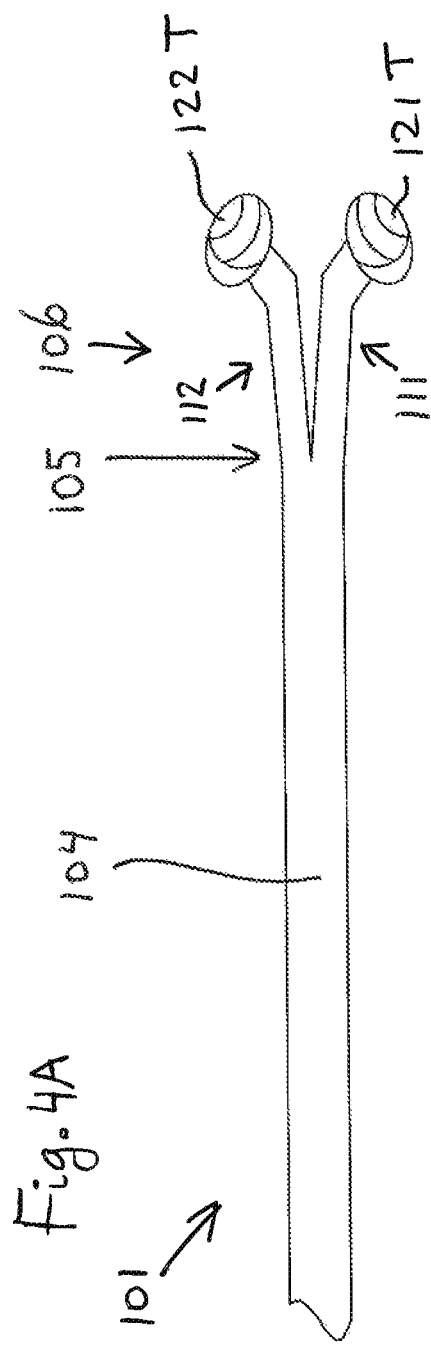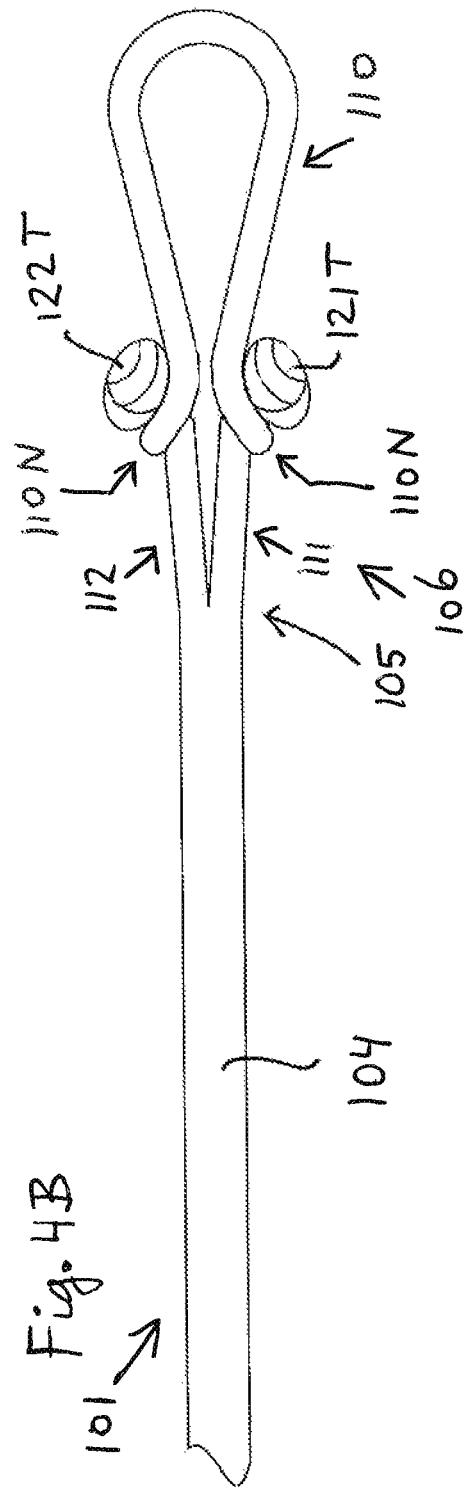

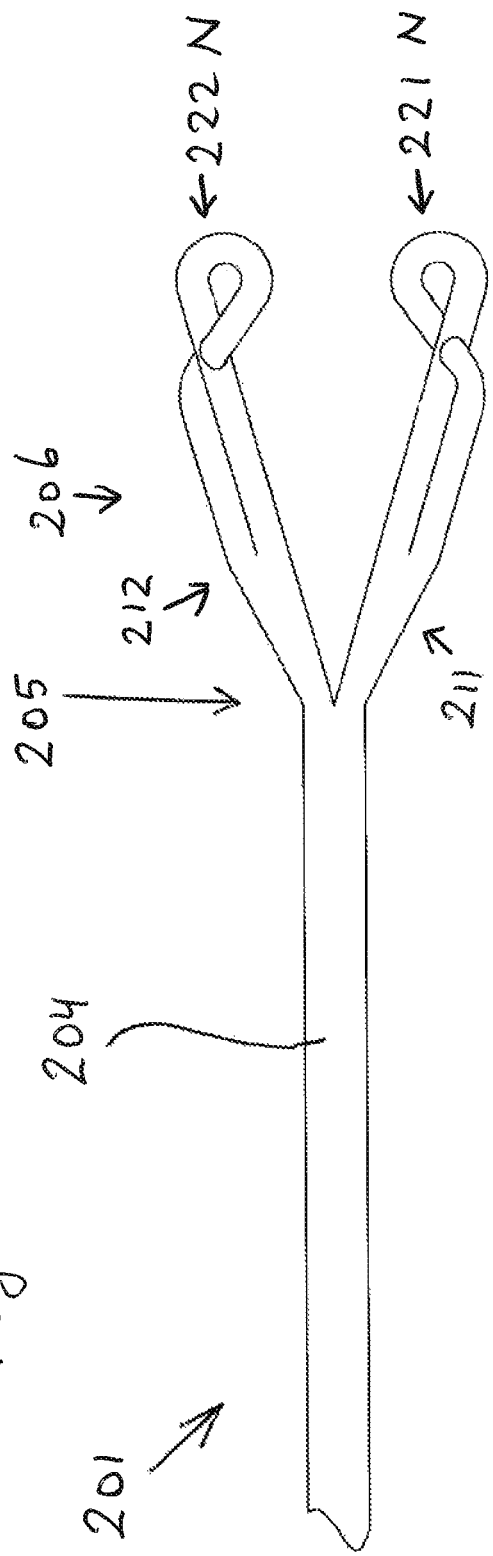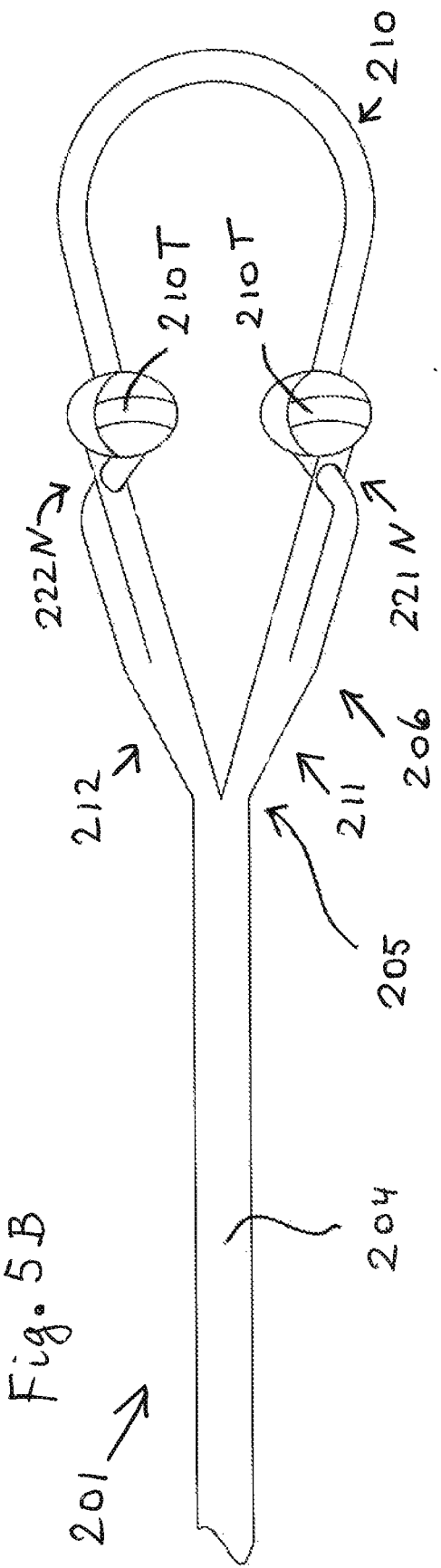

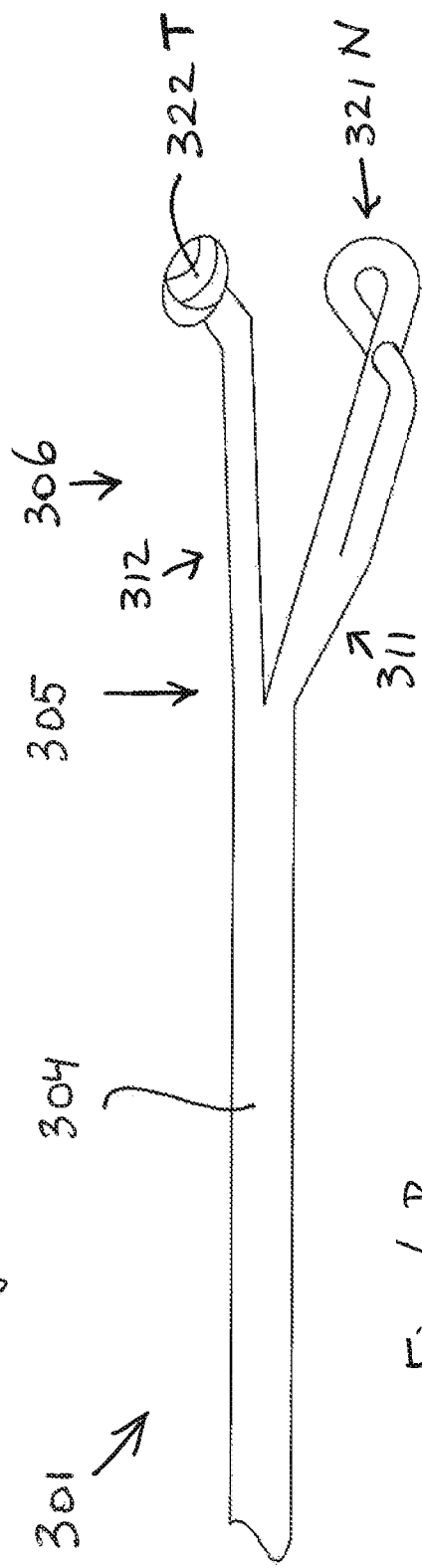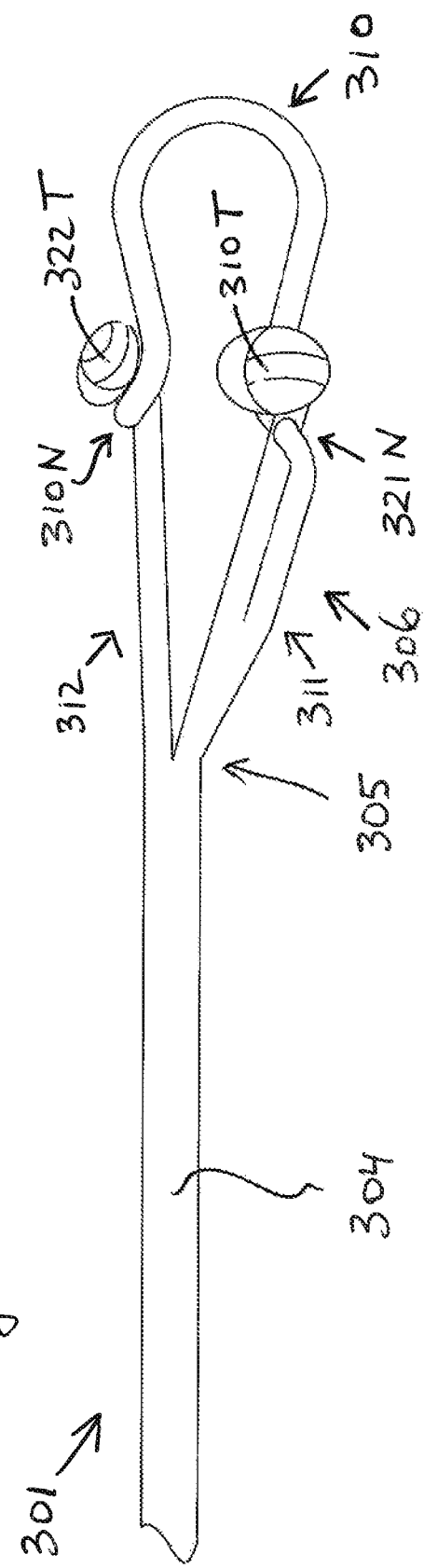

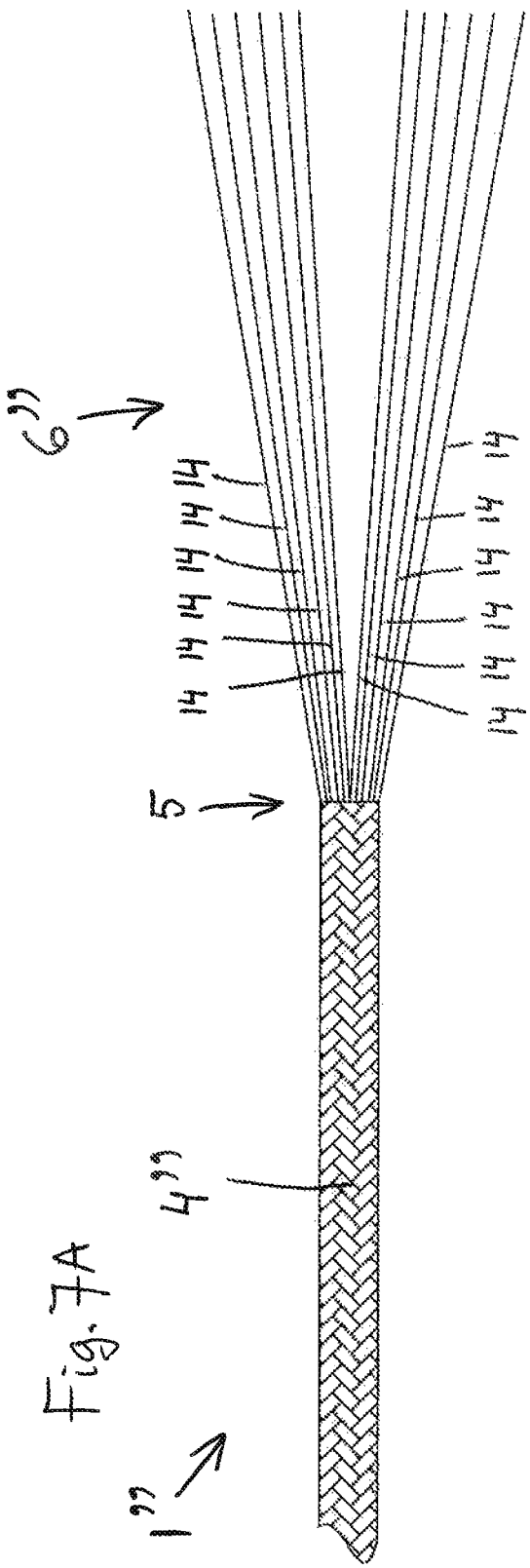
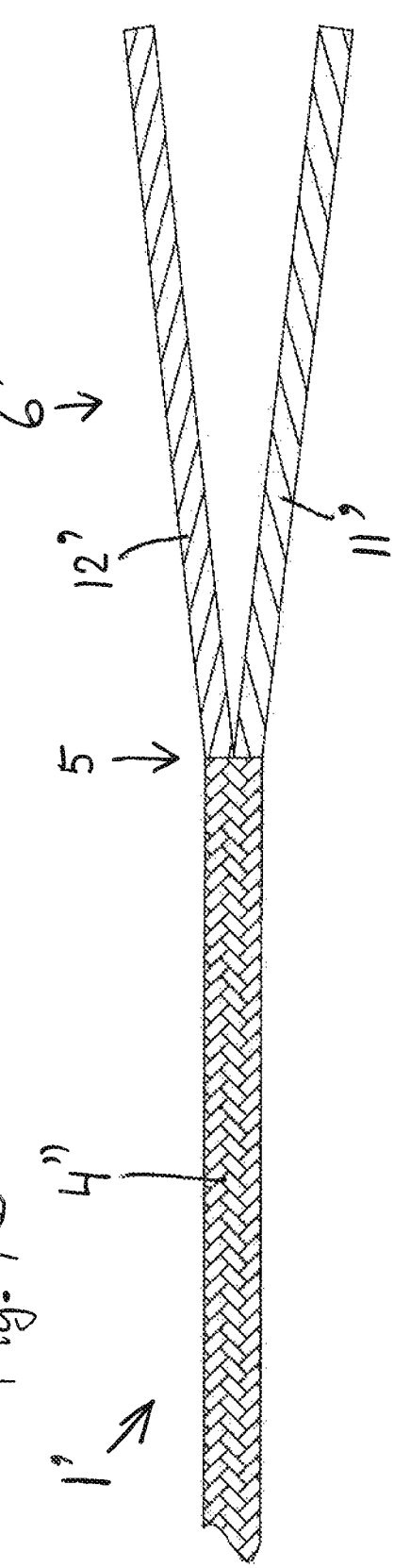

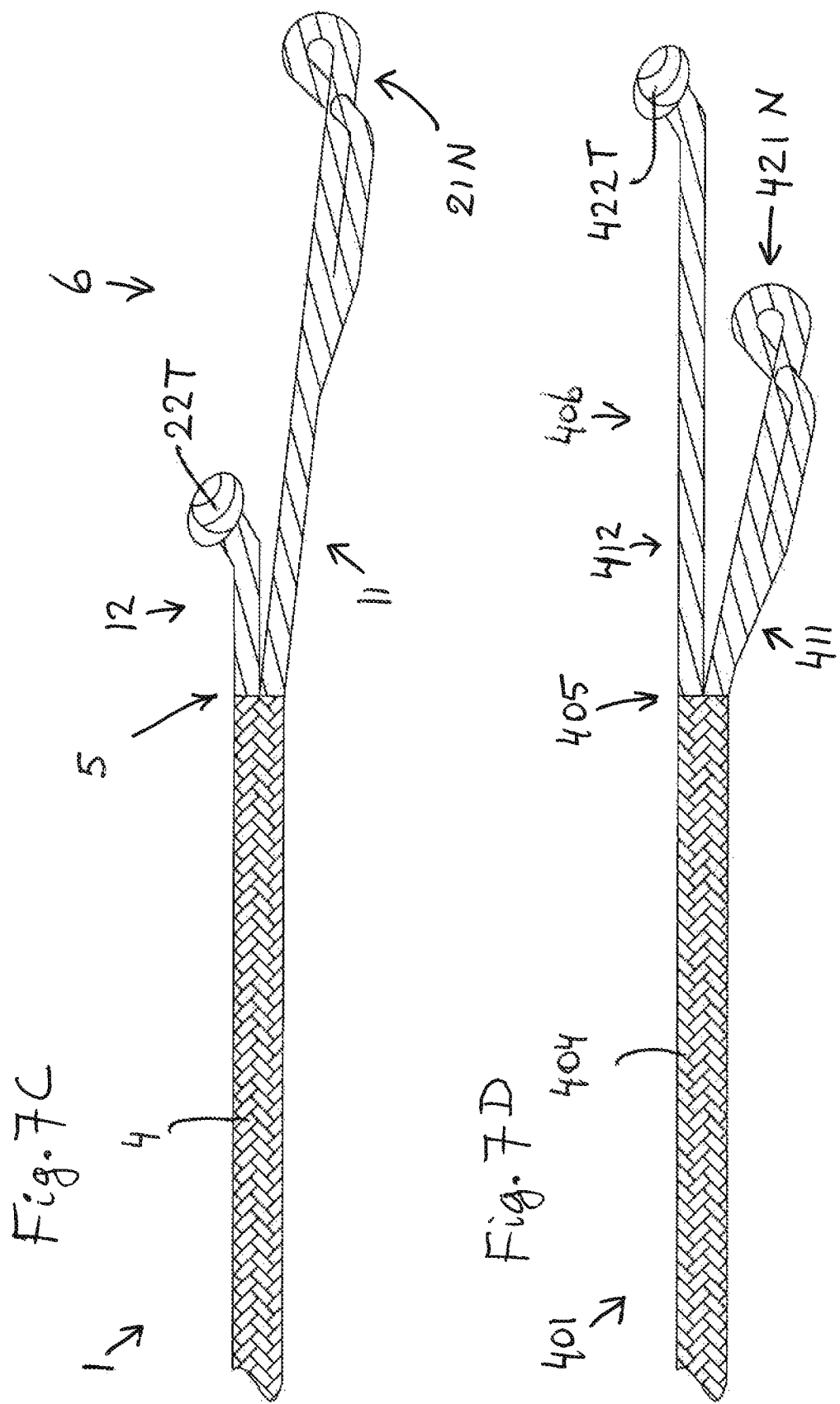

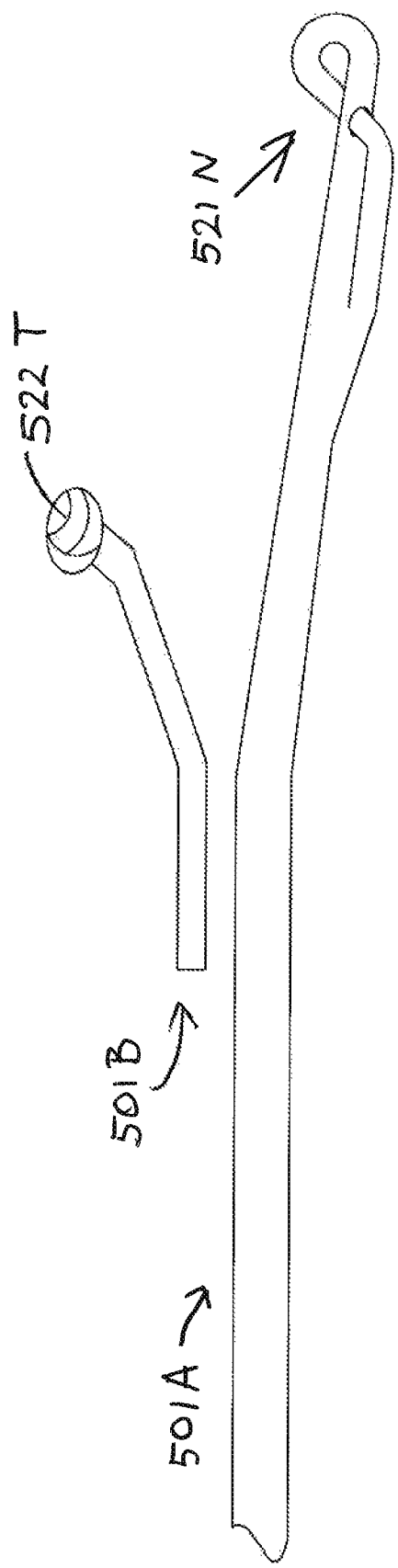
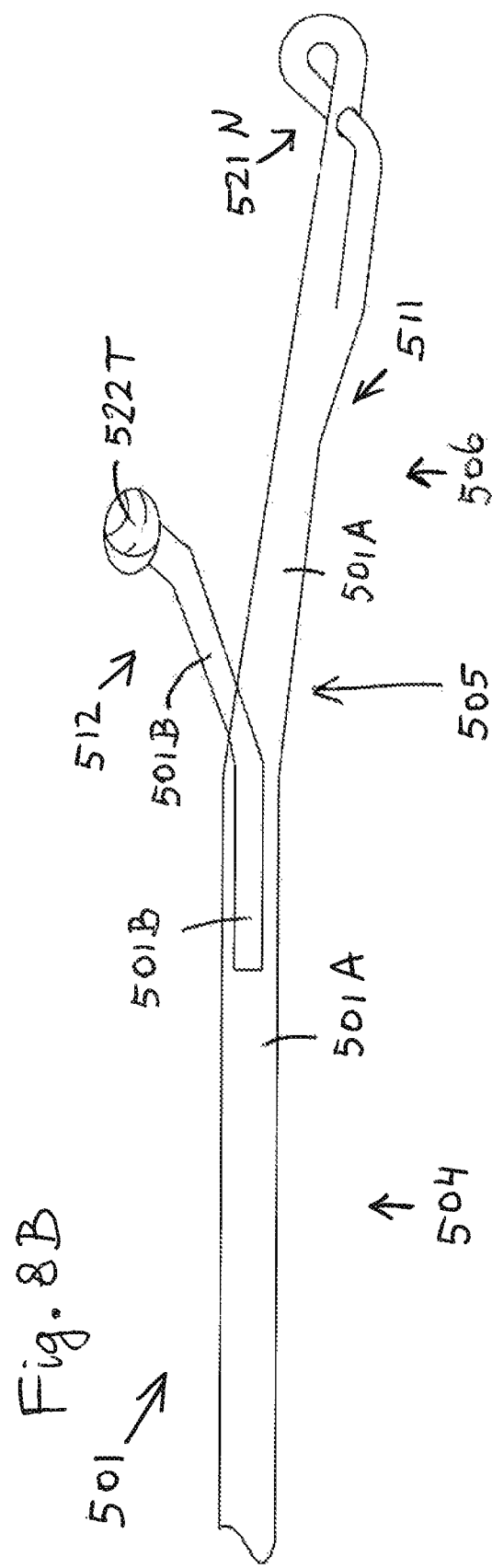

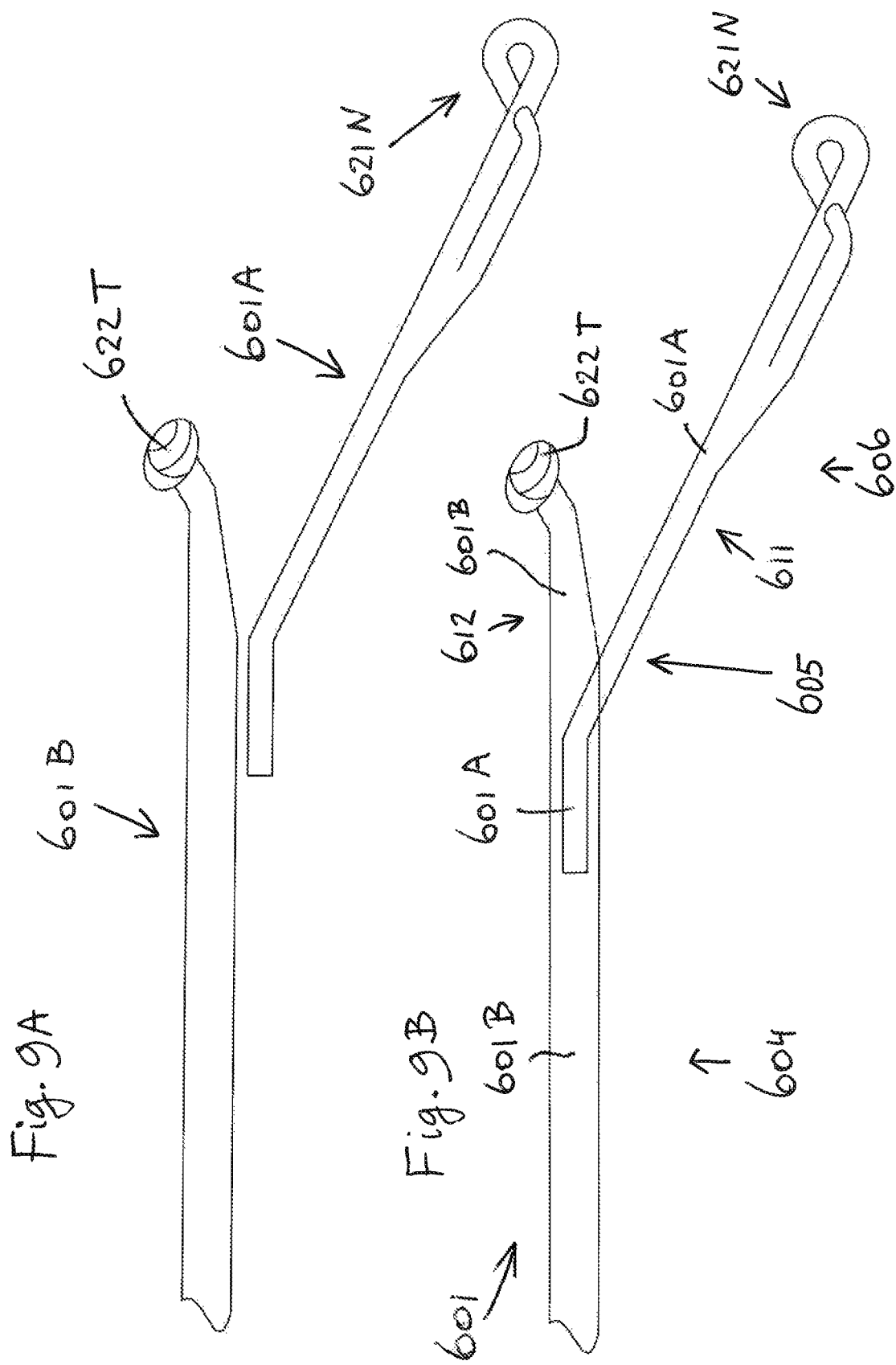

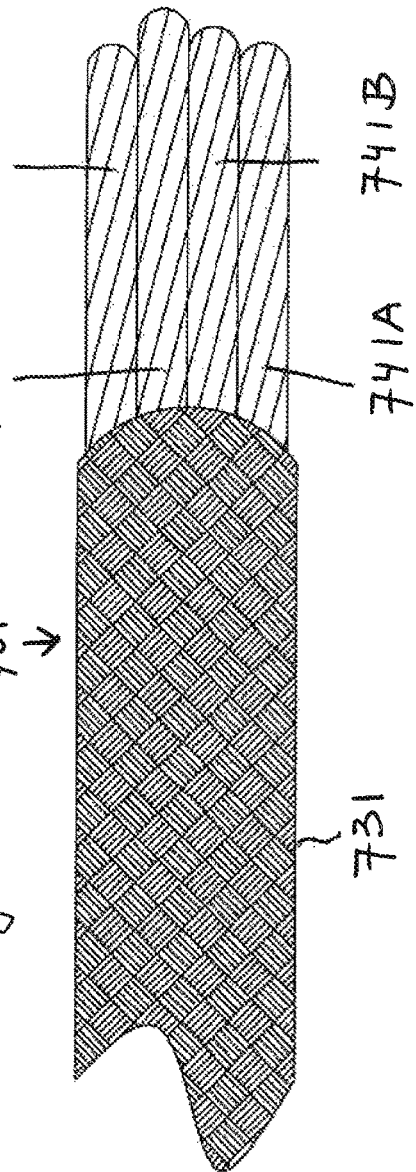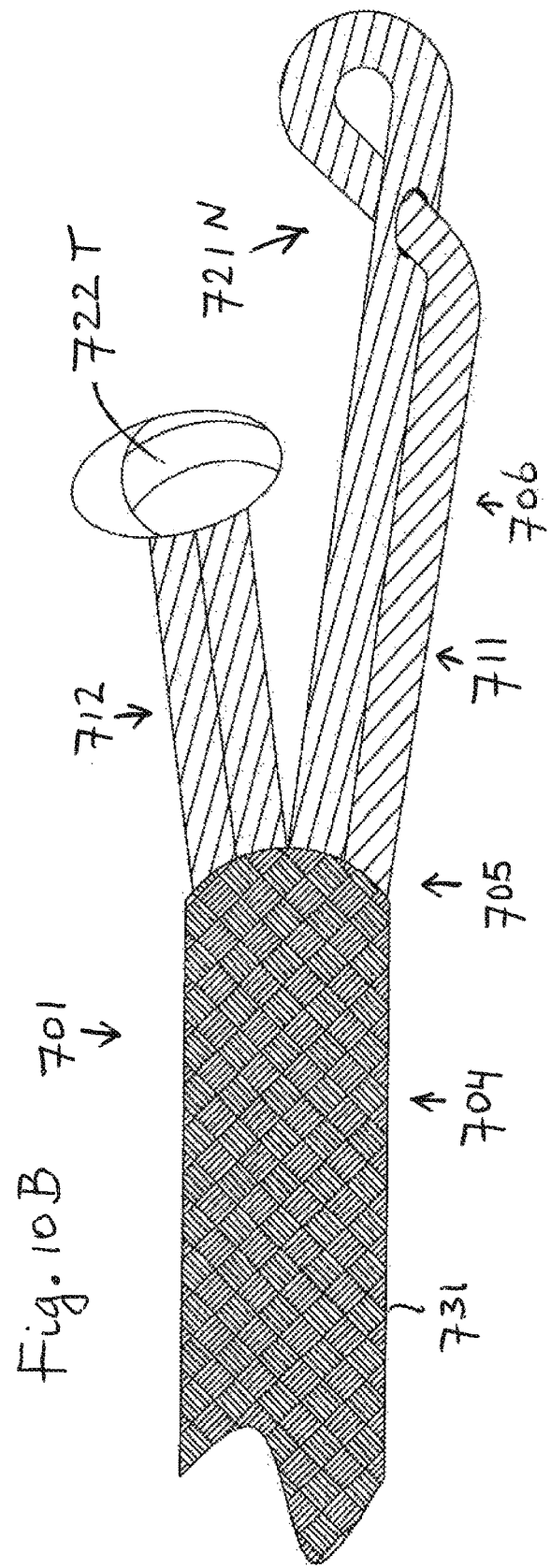

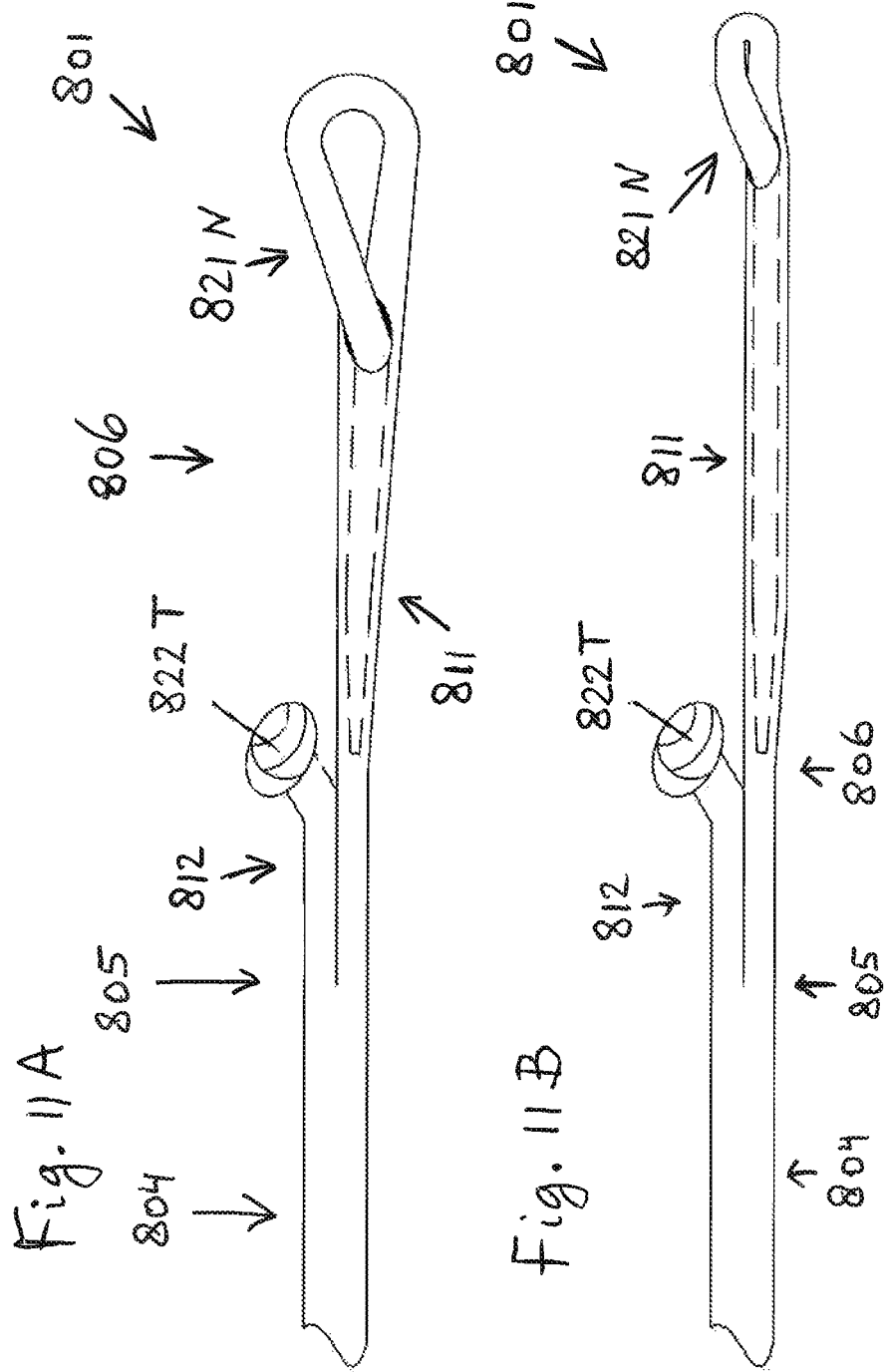

ROPE HAVING AN END CONNECTOR SEGMENT COMPRISING TWO ROPE-BRANCHES FOR MAKING NOOSED CONNECTIONS

The invention relates to a rope, wherein the rope along a longitudinal rope direction of the rope towards a longitudinal rope end of the rope successively comprises at least a main rope segment, a branching position and an end connector segment, wherein the end connector segment comprises a first rope-branch and a second rope-branch, wherein each of the first rope-branch and the second rope-branch at said branching position is branched off from the main rope segment. The invention further relates to use of such a rope, as well as to a method of manufacturing such a rope.

The rope according to the invention may be used offshore as well as onshore, for example as a lifting rope, a towing rope, a mooring rope, or the like.

A rope of the type as initially identified above is known from WO 2012/150469 A2. See for example the rope 100 or the rope 200 of FIG. 9 of the Abstract of WO 2012/150469 A2. It is seen that said rope 100 has the end connector segment 116 having the first rope-branch-eye 50 and the second rope-branch-eye 52. Similarly, said rope 200 has the end connector segment 216 having the first rope-branch-eye 250 and the second rope-branch-eye 252. It is further seen that a connecting component in the form of the shown connecting spool 58 can be used to connect the ropes 100 and 200 together end-to-end.

It is an object of the present invention to provide an alternative rope, which allows for alternative favourable manners of connecting the rope to other ropes and/or to other types of external objects.

For that purpose the invention provides a rope according to the appended independent claim 1, use of such a rope according to the appended independent claim 10, and a method of manufacturing such a rope according to the appended independent claim 12. Specific embodiments of the invention are set forth in the appended dependent claims 2-9 and 11.

Hence, the invention provides a rope, wherein the rope along a longitudinal rope direction of the rope towards a longitudinal rope end of the rope successively comprises at least a main rope segment, a branching position and an end connector segment, wherein the end connector segment comprises a first rope-branch and a second rope-branch, wherein each of the first rope-branch and the second rope-branch at said branching position is branched off from the main rope segment, characterized in that the first rope-branch comprises:
    a noosed first rope-branch portion for making a noosed connection with a thickened rope portion, or
    a thickened first rope-branch portion for making a noosed connection with a noosed rope portion;
and in that the second rope-branch comprises:
    a noosed second rope-branch portion for making a noosed connection with a thickened rope portion, or
    a thickened second rope-branch portion for making a noosed connection with a noosed rope portion.

Such an end connector segment, which comprises such a first rope-branch and such a second rope-branch, allows for many various favourable manners of connecting a rope according to the invention to other ropes and/or to other types of external objects.

Naturally, as used herein, a "noosed portion" of a rope (or of a rope-branch) is referring to an adjustable loop (eye) of the rope (or of the rope-branch), wherein said adjustable loop is tightened as the rope (or the rope-branch) is pulled when a rope having a thickened portion has been inserted through the adjustable loop, so that a tight and secure connection is formed in that the rope having the thickened portion is trapped in the tightened loop. Logically, as used herein, a "noosed connection" refers to such a tight and secure connection. Similarly, as used herein, a "thickened portion" of a rope (or of a rope-branch) refers to a thickened portion of a rope that is insertable through such a noosed portion of a rope to form such a noosed connection.

In a first preferable embodiment of a rope according to the invention:
    the rope comprises a first plurality of strands and a second plurality of strands,
    each strand of said first plurality of strands is extending continuously at least from within the main rope segment to within the first rope-branch,
    said first plurality of strands is at least partially forming either said noosed first rope-branch portion or said thickened first rope-branch portion, as the case may be,
    each strand of said second plurality of strands is extending continuously at least from within the main rope segment to within the second rope-branch, and
    said second plurality of strands is at least partially forming either said noosed second rope-branch portion or said thickened second rope-branch portion, as the case may be.

This first preferable embodiment of a rope according to the invention allows to manufacture the rope, including its specifically configured end connector segment, of a more or less continuously stranded rope construction, providing the advantages of a strong, flexible, soft and compact rope construction.

A first main class of embodiments of a rope according to the invention is characterized in that said first rope-branch comprises said noosed first rope-branch portion, and in that said second rope-branch comprises said thickened second rope-branch portion.

A rope according to said first main class of embodiments allows to easily realize a rope-eye at the longitudinal rope end of the rope, and to easily effectuate connection of the rope via the realized rope-eye. That is, a rope according to said first main class of embodiments allows for a use of the rope, wherein a noosed connection is made between said noosed first rope-branch portion of the first rope-branch, on the one hand, and said thickened second rope-branch portion of the second rope-branch, on the other hand, so that the first rope-branch and the second rope-branch together are forming a rope-eye at said longitudinal rope end of the rope, wherein said rope-eye is suitable for connecting the rope to external objects.

A second main class of embodiments of a rope according to the invention is characterized in that said first rope-branch comprises said thickened first rope-branch portion, and in that said second rope-branch comprises said thickened second rope-branch portion.

A third main class of embodiments of a rope according to the invention is characterized in that said first rope-branch comprises said noosed first rope-branch portion, and in that said second rope-branch comprises said noosed second rope-branch portion.

As used herein, an attainable maximum first effective length of the first rope-branch equals a vertical first length along the first rope-branch as measured in a first reference condition of the rope, wherein in said first reference condition the first rope-branch, as well as its noosed first rope-branch portion or its thickened first rope-branch portion, as the case may be, are as much as possible in a first plumb line configuration, in which the very end of the noosed first rope-branch portion or of the thickened first rope-branch portion, as the case may be, corresponds to the lowest part of the noosed first rope-branch portion or of the thickened first rope-branch portion, as the case may be, and is considered to be a concentrated first plumb mass point of the first plumb line configuration, and wherein said vertical first length is measured from the branching position up to said very end of the noosed first rope-branch portion or of the thickened first rope-branch portion, as the case may be.

Analogously, as used herein, an attainable maximum second effective length of the second rope-branch equals a vertical second length along the second rope-branch as measured in a second reference condition of the rope, wherein in said second reference condition the second rope-branch, as well as its noosed second rope-branch portion or its thickened second rope-branch portion, as the case may be, are as much as possible in a second plumb line configuration, in which the very end of the noosed second rope-branch portion or of the thickened second rope-branch portion, as the case may be, corresponds to the lowest part of the noosed second rope-branch portion or of the thickened second rope-branch portion, as the case may be, and is considered to be a concentrated second plumb mass point of the second plumb line configuration, and wherein said vertical first length is measured from the branching position up to said very end of the noosed second rope-branch portion or of the thickened second rope-branch portion, as the case may be.

In further preferable embodiments of a rope according to the invention, the attainable maximum first effective length of the first rope-branch is higher than 105% of the attainable maximum second effective length of the second rope-branch, more preferably higher than 110% of said attainable maximum second effective length, and yet more preferably higher than 120% of said attainable maximum second effective length, and yet more preferably higher than 150% of said attainable maximum second effective length, and yet more preferably higher than 200% of said attainable maximum second effective length, and yet more preferably higher than 300% of said attainable maximum second effective length.

In other further preferable embodiments of a rope according to the invention, the attainable maximum second effective length of the second rope-branch is higher than 105% of the attainable maximum first effective length of the first rope-branch, more preferably higher than 110% of said attainable maximum first effective length, and yet more preferably higher than 120% of said attainable maximum first effective length, and yet more preferably higher than 150% of said attainable maximum first effective length, and yet more preferably higher than 200% of said attainable maximum first effective length, and yet more preferably higher than 300% of said attainable maximum first effective length.

All ropes according to the last-mentioned further preferable embodiments and the last-mentioned other further preferable embodiments have in common that such a rope has mutually unequal maximum effective lengths of the first rope-branch and the second rope-branch. Such mutually unequal maximum effective lengths further contribute to providing many various favourable manners of connecting a rope according to the invention to other ropes and to other types of external objects.

In the following, the invention is further elucidated with reference to non-limiting embodiments and with reference to the schematic figures in the attached drawing, in which the following is shown.

FIG. 1 shows, in a side view, an example of an embodiment of a rope according to the above-mentioned first main class of embodiments of a rope according to the invention, wherein the rope is hanging with its main rope segment extending vertically and with its end connector segment below.

FIG. 2A shows the rope of FIG. 1 in a similar situation as in FIG. 1, however wherein this time the rope is shown in its above-mentioned first reference condition in order to illustrate the attainable maximum first effective length of the first rope-branch of the rope.

FIG. 2B shows the rope of FIG. 1 in a similar situation as in FIG. 1, however wherein this time the rope is shown in its above-mentioned second reference condition in order to illustrate the attainable maximum second effective length of the second rope-branch of the rope.

FIG. 3A shows the rope of FIG. 1 in a similar situation as in FIG. 1, however wherein this time an end portion of the longer first rope-branch has been bent upwards toward the end of the shorter second rope-branch, and wherein a noosed connection is made between the noosed first rope-branch portion of the first rope-branch, on the one hand, and the thickened second rope-branch portion of the second rope-branch, on the other hand, so that the first rope-branch and the second rope-branch together are forming a rope-eye at the longitudinal rope end of the rope.

FIG. 3B shows the rope of FIG. 1 in a similar situation as in FIG. 3A, however wherein this time, before said noosed connection was made, the end portion of the longer first rope-branch had been passed through a lifting lug of a hoisting load.

FIG. 4A shows, in a side view, an example of an embodiment of a rope according to the above-mentioned second main class of embodiments of a rope according to the invention.

FIG. 4B shows the rope of FIG. 4A in a similar situation as in FIG. 4A, however wherein this time the rope of FIG. 4A is connected to another rope having two noosed rope portions at its two opposite rope ends, respectively.

FIG. 5A shows, in a side view, an example of an embodiment of a rope according to the above-mentioned third main class of embodiments of a rope according to the invention.

FIG. 5B shows the rope of FIG. 5A in a similar situation as in FIG. 5A, however wherein this time the rope of FIG. 5A is connected to another rope having two thickened rope portions at its two opposite rope ends, respectively.

FIG. 6A shows, in a side view, another example of an embodiment of a rope according to the above-mentioned first main class of embodiments of a rope according to the invention.

FIG. 6B shows the rope of FIG. 6A in a similar situation as in FIG. 6A, however wherein this time the rope of FIG. 6A is connected to another rope having a noosed rope portion and a thickened rope portion at its two opposite rope ends, respectively.

FIGS. 7A, 7B, 7C, 7D illustrate an example of a first embodiment of a method of manufacturing a rope according to the invention.

FIGS. 8A, 8B illustrate an example of a second embodiment of a method of manufacturing a rope according to the invention.

FIGS. 9A, 9B illustrate an example of a third embodiment of a method of manufacturing a rope according to the invention.

FIGS. 10A, 10B illustrate an example of a fourth embodiment of a method of manufacturing a rope according to the invention.

FIGS. 11A, 11B show, in a side view, a rope according to the invention, wherein the rope is similar to the rope of FIG. 1, however wherein the embodiment of the noosed first rope-branch portion of the rope of FIGS. 11A, 11B is different from that of the rope of FIG. 1.

Now, reference is first made to the rope 1 shown in FIGS. 1, 2A, 2B, 3A, 3B. The reference signs used in FIGS. 1, 2A, 2B, 3A, 3B are referring to the above-mentioned parts and aspects of the invention, as well as to related parts and aspects, in the following manner.

1 rope
2 longitudinal rope direction
3 longitudinal rope end
4 main rope segment
5 branching position
6 end connector segment
8 rope-eye
9 lifting lug
10 external object (e.g. a hoisting load)
11 first rope-branch
12 second rope-branch
21N noosed first rope-branch portion
22T thickened second rope-branch portion
L1 attainable maximum first effective length
L2 attainable maximum second effective length Based on the above introductory description, including the brief description of the drawing figures, and based on the above-listed reference signs used in FIGS. 1, 2A, 2B, 3A, 3B, the examples of FIGS. 1, 2A, 2B, 3A, 3B are readily self-explanatory. The following brief additional explanations are given of FIGS. 3A, 3B, which illustrate a use according to the invention of the rope 1 according to the invention.

In FIGS. 3A, 3B a noosed connection has been made between the noosed first rope-branch portion 21N of the first rope-branch 11, on the one hand, and the thickened second rope-branch portion 22T of the second rope-branch 12, on the other hand, so that the first rope-branch 11 and the second rope-branch 12 together are forming the rope-eye 8 at the longitudinal rope end 3 of the rope 1. FIG. 3B illustrates a situation, in which, before said noosed connection was made, an end portion of the longer first rope-branch 11 had been passed through the lifting lug 9 of an external object in the form of the shown hoisting load 10.

Reference is now made to FIGS. 4A, 4B, which show the rope 101 comprising the main rope segment 104, the branching position 105 and the end connector segment 106. The end connector segment 106 comprises the first rope-branch 111, which has the thickened first rope-branch portion 121T, and the second rope-branch 112, which has the thickened second rope-branch portion 122T. FIG. 4B additionally shows another rope 110, which has two noosed rope portions 110N at its two opposite rope ends, respectively. In FIG. 4B a noosed connection has been made between the thickened first rope-branch portion 121T of the rope 101 and one of the two noosed rope portions 110N of the rope 110 while another noosed connection has been made between the thickened second rope-branch portion 122T of the rope 101 and the other of the two noosed rope portions 110N of the rope 110.

Reference is now made to FIGS. 5A, 5B, which show the rope 201 comprising the main rope segment 204, the branching position 205 and the end connector segment 206. The end connector segment 206 comprises the first rope-branch 211, which has the noosed first rope-branch portion 221N, and the second rope-branch 212, which has the noosed second rope-branch portion 122N. FIG. 5B additionally shows another rope 210, which has two thickened rope portions 210T at its two opposite rope ends, respectively. In FIG. 5B a noosed connection has been made between the noosed first rope-branch portion 221N of the rope 201 and one of the two thickened rope portions 210T of the rope 210, while another noosed connection has been made between the noosed second rope-branch portion 222N of the rope 201 and the other of the two thickened rope portions 210T of the rope 210.

Reference is now made to FIGS. 6A, 6B, which show the rope 301 comprising the main rope segment 304, the branching position 305 and the end connector segment 306. The end connector segment 306 comprises the first rope-branch 311, which has the noosed first rope-branch portion 321N, and the second rope-branch 312, which has the thickened second rope-branch portion 322T. FIG. 6B additionally shows another rope 310, which has a thickened rope portion 310T at one of its two opposite rope ends, and a noosed rope portion 310N at the other of its two opposite rope ends. In FIG. 6B a noosed connection has been made between the noosed first rope-branch portion 321N of the rope 301 and the thickened rope portion 310T of the rope 310, while another noosed connection has been made between the thickened second rope-branch portion 322T of the rope 301 and the noosed rope portion 310N of the rope 310.

Reference is now made to FIGS. 7A, 7B, 7C, 7D which illustrate an example of a first embodiment of a method of manufacturing a rope according to the invention.

The rope 1" of FIG. 7A comprises a main rope segment 4" of, for example, braided or laid rope strands. The rope 1" further comprises the branching position 5 and a rope end segment 6". In the shown example, the rope end segment 6" comprises twelve rope strands 14. It is noted that the construction of the rope end segment 6" previously was identical to and integral with the rope construction of the main rope segment 4". In fact, the twelve rope strands 14 of the rope end segment 6" as shown in FIG. 7A were obtained by mutually disentangling (for example un-braiding or un-laying) the rope strands of said previously identical and integral rope construction.

The rope 1' of FIG. 7B has the same main rope segment 4" and the same branching position 5 as the rope 1" of FIG. 7A. However, the rope 1' of FIG. 7B has a rope end segment 6', which is different from the rope end segment 6" of the rope 1" of FIG. 7A. That is, the rope 1' of FIG. 7B has two rope end portions 11' and 12'. Each of said rope end portions 11' and 12' has been obtained by mutually entangling (for example braiding or laying) six of the twelve rope strands 14 of the rope 1" of FIG. 7A. Purely to illustratively elucidate this, the twelve mutually disentangled rope strands 14 in FIG. 7A are shown in two separately arranged groups, each having six mutually disentangled rope strands 14.

The rope 1 of FIG. 7C, which is the same as the rope 1 of FIGS. 1-5, may be obtained by transforming the rope end portion 11' of the rope 1' of FIG. 7B into the first rope-branch 11 having the noosed first rope-branch portion 21N, and by transforming the rope end portion 12' of the rope 1' of FIG. 7B into the second rope-branch 12 having the thickened second rope-branch portion 22T. Said transformations can be performed by many various methods, including many various methods known in the art, for making such a noosed first rope-branch portion 21N and such a thickened second rope-branch portion 22T.

It is noted that the mutually unequal lengths L1 and L2 of the two rope-branches 11 and 12 of the rope 1 (see FIGS. 2A, 2B) may for example be obtained by considerably shortening the rope strands 14 used for the rope end portion 12' in FIG. 7B prior to transforming the rope end portion 12' into the second rope-branch 12 of FIG. 7C.

FIG. 7D shows another example of a rope that may be obtained from the rope 1' of FIG. 7B. The rope 401 of FIG. 7D comprises the main rope segment 404, the branching position 405 and the end connector segment 406. The end connector segment 406 comprises the first rope-branch 411, which has the noosed first rope-branch portion 421N, and the second rope-branch 412, which has the thickened second rope-branch portion 422T. The rope 401 of FIG. 7D may be obtained by transforming the rope end portion 11' of the rope 1' of FIG. 7B into the first rope-branch 411 having the noosed first rope-branch portion 421N, and by transforming the rope end portion 12' of the rope 1' of FIG. 7B into the second rope-branch 412 having the thickened second rope-branch portion 422T. It is seen that in the example of FIG. 7D the attainable maximum second effective length of the second rope-branch 412 is higher than the attainable maximum first effective length of the first rope-branch 411.

Reference is now made to FIGS. 8A, 8B, which illustrate an example of a second embodiment of a method of manufacturing a rope according to the invention, more specifically a method of manufacturing the rope 501 of FIG. 8B.

FIG. 8A shows two separate first and second ropes 501A and 501B, respectively. The first rope 501A comprises the noosed first rope-branch portion 521N. The rope 501B comprises the thickened second rope-branch portion 522T. Each of the first and second ropes 501A and 501B can be manufactured by many various methods.

The rope 501 of FIG. 8B is obtained by splicing an end portion of a main rope segment of the rope 501B into an intermediate portion of a main rope segment of the rope 501A in such manner that the rope 501 has the shown main rope segment 504, the shown branching position 505 and the shown end connector segment 506 having the shown two rope-branches 511 and 512, wherein the first rope-branch 511 comprises the noosed first rope-branch portion 521N of the first rope 501A as the noosed first rope-branch portion 521N of the rope 501, and wherein the second rope-branch 512 comprises the thickened second rope-branch portion 522T of the second rope 501B as the thickened second rope-branch portion 522T of the rope 501.

It is noted that many various splicing techniques may be applied for said splicing of the end portion of the main rope segment of the rope 501B into the intermediate portion of the main rope segment of the rope 501A.

Reference is now made to FIGS. 9A, 9B, which illustrate an example of a third embodiment of a method of manufacturing a rope according to the invention, more specifically a method of manufacturing the rope 601 of FIG. 9B.

FIG. 9A shows two separate first and second ropes 601A and 601B, respectively. The first rope 601A comprises the noosed first rope-branch portion 621N. The rope 601B comprises the thickened second rope-branch portion 622T. Each of the first and second ropes 601A and 601B can be manufactured by many various methods.

The rope 601 of FIG. 9B is obtained by splicing an end portion of a main rope segment of the rope 601A into an intermediate portion of a main rope segment of the rope 601B in such manner that the rope 601 has the shown main rope segment 604, the shown branching position 605 and the shown end connector segment 606 having the shown two rope-branches 611 and 612, wherein the first rope-branch 611 comprises the noosed first rope-branch portion 621N of the first rope 601A as the noosed first rope-branch portion 621N of the rope 601, and wherein the second rope-branch 612 comprises the thickened second rope-branch portion 622T of the second rope 601B as the thickened second rope-branch portion 622T of the rope 601.

It is noted that many various splicing techniques may be applied for said splicing of the end portion of the main rope segment of the rope 601A into the intermediate portion of the main rope segment of the rope 601B.

Reference is now made to FIGS. 10A, 10B, which illustrate an example of a fourth embodiment of a method of manufacturing a rope according to the invention, more specifically a method of manufacturing the rope 701 of FIG. 10B.

FIG. 10A shows a rope 701' of multiple load-bearing sub-ropes 741A, 741B, 742A, 742B within an outer jacket 731.

The rope 701 of FIG. 10B is obtained by coupling the sub-ropes 741A, 741B together and by coupling the sub-ropes 742A, 742B together, in such manner that the rope 701 has the shown main rope segment 704, the shown branching position 705 and the shown end connector segment 706 having the shown two rope-branches 711 and 712, wherein the first rope-branch 711 comprises the shown noosed first rope-branch portion 721N of the rope 701, and wherein the second rope-branch 712 comprises the shown thickened second rope-branch portion 722T of the rope 701.

It is noted that many various coupling techniques may be applied for said coupling the sub-ropes 741A, 741B together and for said coupling the sub-ropes 742A, 742B together. Said many various coupling techniques may comprise many various splicing techniques for splicing the sub-ropes 741A, 741B into one another and for splicing the sub-ropes 742A, 742B into one another. Said many various coupling techniques may further comprise many various techniques for forming the noosed first rope-branch portion 721N and for forming the thickened second rope-branch portion 722T.

Reference is now made to FIGS. 11A, 11B, which illustrate a rope according to the invention, wherein the rope is similar to the rope of FIG. 1, however wherein the embodiment of the noosed first rope-branch portion of the rope of FIGS. 11A, 11B is different from that of the rope of FIG. 1.

In the examples of FIGS. 1, 5A, 6A, 7C, 7D, 8A, 8B, 9A, 9B, 10B it is seen that each time a noosed portion of the rope concerned is of a type in which the line of the adjustable loop that forms the noosed portion is transversely running through itself in a transversely slidable manner. This is a known embodiment of a noosed portion of a rope for making a noosed connection with a thickened portion of a rope.

The rope 801 of FIGS. 11A, 11B comprises the main rope segment 804, the branching position 805 and the end connector segment 806. The end connector segment 806 comprises the first rope-branch 811, which has the noosed first rope-branch portion 821N, and the second rope-branch 812, which has the thickened second rope-branch portion 822T. The difference between the noosed first rope-branch portion 821N of the rope 801 of FIGS. 11A, 11B and the noosed portion 21N of the rope 1 of FIG. 1 is that the noosed first rope-branch portion 821N is not of the known type in which the line of the adjustable loop that forms the noosed portion is transversely running through itself in a transversely slidable manner. Instead, the line of the adjustable loop that forms the noosed portion 821N of the rope 801 of FIGS.

11A, 11B is coaxially running through itself in a coaxially slidable manner. Also this coaxially slidable embodiment is a known embodiment of a noosed portion of a rope for making a noosed connection with a thickened portion of a rope.

The difference between the shown situations of FIGS. 11A and 11B is that in FIG. 11B the adjustable loop that forms the noosed portion 821N of the rope 801 is in a more tightened condition than in FIG. 11A.

It is further noted that each of the above-mentioned examples of a method of manufacturing a rope according to the invention (said examples being illustrated by FIGS. 7, 8, 9, 10) can be used to manufacture a rope according to the above-mentioned "first preferable embodiment" of a rope according to the invention. As mentioned in the introduction of the present disclosure, said "first preferable embodiment" of a rope is characterized in that:

the rope comprises a first plurality of strands and a second plurality of strands,
each strand of said first plurality of strands is extending continuously at least from within the main rope segment to within the first rope-branch,
said first plurality of strands is at least partially forming either said noosed first rope-branch portion or said thickened first rope-branch portion, as the case may be,
each strand of said second plurality of strands is extending continuously at least from within the main rope segment to within the second rope-branch, and
said second plurality of strands is at least partially forming either said noosed second rope-branch portion or said thickened second rope-branch portion, as the case may be.

If so manufactured, the respective ropes shown in FIGS. 7, 8, 9, 10 have the following features.

For the rope 1 of FIG. 7C, the main rope segment 4 and the first rope-branch 11 are each containing said first plurality of strands, while the main rope segment 4 and the second rope-branch 12 are each containing said second plurality of strands.

For the rope 401 of FIG. 7D, the main rope segment 404 and the first rope-branch 411 are each containing said first plurality of strands, while the main rope segment 404 and the second rope-branch 412 are each containing said second plurality of strands.

For the rope 501 of FIG. 8B, the main rope segment 504 and the first rope-branch 511 are each containing said first plurality of strands, while the main rope segment 504 and the second rope-branch 512 are each containing said second plurality of strands.

For the rope 601 of FIG. 9B, the main rope segment 604 and the first rope-branch 611 are each containing said first plurality of strands, while the main rope segment 604 and the second rope-branch 612 are each containing said second plurality of strands.

For the rope 701 of FIG. 10B, the main rope segment 704 and the first rope-branch 711 are each containing said first plurality of strands, while the main rope segment 704 and the second rope-branch 712 are each containing said second plurality of strands.

Similarly, the respective ropes shown in FIGS. 4, 5, 6, 11 may be manufactured to have the following features.

For the rope 101 of FIGS. 4A-4B, the main rope segment 104 and the first rope-branch 111 are each containing said first plurality of strands, while the main rope segment 104 and the second rope-branch 112 are each containing said second plurality of strands.

For the rope 201 of FIGS. 5A-5B, the main rope segment 204 and the first rope-branch 211 are each containing said first plurality of strands, while the main rope segment 204 and the second rope-branch 212 are each containing said second plurality of strands.

For the rope 301 of FIGS. 6A-6B, the main rope segment 304 and the first rope-branch 311 are each containing said first plurality of strands, while the main rope segment 304 and the second rope-branch 312 are each containing said second plurality of strands.

For the rope 801 of FIGS. 11A-11B, the main rope segment 804 and the first rope-branch 811 are each containing said first plurality of strands, while the main rope segment 804 and the second rope-branch 812 are each containing said second plurality of strands.

It is remarked that the above-mentioned examples do not limit the invention, and that various alternatives are possible within the scope of the appended claims.

For example, many various types of embodiments of the noosed first rope-branch portion and of the noosed second rope-branch portion are possible. Similarly, many various types of embodiments of the thickened first rope-branch portion and of the thickened second rope-branch portion are possible. Such a thickened rope-branch portion may for example be formed by a line being knotted together, which can be done in many various manners. In lieu of such a knot formed by a line being knotted together, or in addition to such a knot, it is also possible to form a thickened rope-branch portion from less soft materials, such as by assembling parts of plastic and/or metal with the rope line.

In the claims, the word "comprising" does not exclude other elements or steps, and the indefinite article "a" or "an" does not exclude a plurality. A single unit may fulfill the functions of several items recited in the claims. For the purpose of clarity and a concise description, features are disclosed herein as part of the same or separate embodiments, however, it will be appreciated that the scope of the invention may include embodiments having combinations of all or some of the features disclosed. The mere fact that certain measures are recited in mutually different dependent claims does not indicate that a combination of these measures can not be used to advantage. Any reference signs in the claims should not be construed as limiting the scope.

The invention claimed is:

1. A rope, wherein the rope along a longitudinal rope direction of the rope towards a longitudinal rope end of the rope successively comprises at least a main rope segment, a branching position and an end connector segment, wherein the end connector segment comprises a first rope-branch and a second rope-branch, wherein each of the first rope-branch and the second rope-branch at said branching position is branched off from the main rope segment,
wherein the first rope-branch comprises a noosed first rope-branch portion for making a noosed connection with a thickened rope portion and wherein
the second rope-branch comprises
a thickened second rope-branch portion for making a noosed connection with a noosed rope portion.

2. The rope according to claim 1, wherein:
the rope comprises a first plurality of strands and a second plurality of strands,
each strand of said first plurality of strands is extending continuously at least from within the main rope segment to within the first rope-branch,
said first plurality of strands is at least partially forming said noosed first rope-branch portion, each strand of said second plurality of strands is extending continuously at least from within the main rope segment to within the second rope-branch, and said second plurality of strands is at least partially forming said thickened second rope-branch portion.

3. The rope according to claim 1, wherein an attainable maximum first effective length of the first rope-branch is higher than 105% of an attainable maximum second effective length of the second rope-branch.

4. The rope according to claim 3, wherein said attainable maximum first effective length is higher than 110% of said attainable maximum second effective length.

5. The rope according to claim 4, wherein said attainable maximum first effective length is higher than 120% of said attainable maximum second effective length.

6. The rope according to claim 5, wherein said attainable maximum first effective length is higher than 150% of said attainable maximum second effective length.

7. The rope according to claim 6, wherein said attainable maximum first effective length is higher than 200% of said attainable maximum second effective length.

8. The rope according to claim 7, wherein said attainable maximum first effective length is higher than 300% of said attainable maximum second effective length.

9. The rope according to claim 1, wherein an attainable maximum second effective length of the second rope-branch is higher than 105% of an attainable maximum first effective length of the first rope-branch.

10. The rope according to claim 9, wherein said attainable maximum second effective length is higher than 110% of said attainable maximum first effective length.

11. The rope according to claim 10, wherein said attainable maximum second effective length is higher than 120% of said attainable maximum first effective length.

12. The rope according to claim 11, wherein said attainable maximum second effective length is higher than 150% of said attainable maximum first effective length.

13. The rope according to claim 12, wherein said attainable maximum second effective length is higher than 200% of said attainable maximum first effective length.

14. The rope according to claim 13, wherein said attainable maximum second effective length is higher than 300% of said attainable maximum first effective length.

15. Use of the rope according to claim 1 for connecting the rope to another rope and/or to another type of external object.

16. The use according to claim 15, wherein said first rope-branch comprises said noosed first rope-branch portion, and wherein said second rope-branch comprises said thickened second rope-branch portion, and wherein a noosed connection is made between said noosed first rope-branch portion of the first rope-branch, on the one hand, and said thickened second rope-branch portion of the second rope-branch, on the other hand, so that the first rope-branch and the second rope-branch together are forming a rope-eye at said longitudinal rope end of the rope, wherein said rope-eye is suitable for connecting the rope to external objects.

17. An assembly of:
the rope according to claim 1, and
a further rope having a noosed rope portion and a thickened rope portion at its two opposite ends, respectively, wherein the noosed first rope-branch portion of the rope and the thickened rope portion of the further rope are configured for making a noosed connection with one another,
and wherein the thickened second rope-branch portion of the rope and the noosed rope portion of the further rope are configured for making a noosed connection with one another.

18. Use of the assembly according to claim 17, wherein:
a noosed connection is made between the noosed first rope-branch portion of the rope and the thickened rope portion of the further rope; and/or
a noosed connection is made between the thickened second rope-branch portion of the rope and the noosed rope portion of the further rope.

19. The rope according to claim 1, wherein the rope is obtained from a first rope, which comprises said noosed first rope-branch portion, and a second rope, which comprises said thickened first rope-branch portion,
by splicing an end portion of a first main rope segment of the first rope into an intermediate portion of a second main rope segment of the second rope, or
by splicing an end portion of a second main rope segment of the second rope into an intermediate portion of a first main rope segment of the first rope.

20. A method of manufacturing a rope, wherein the method comprises manufacturing a main rope segment and an end connector segment,
in such manner that
the rope along a longitudinal rope direction of the rope towards a longitudinal rope end of the rope successively comprises at least said main rope segment, a branching position and said end connector segment, wherein the end connector segment comprises a first rope-branch and a second rope-branch, wherein each of the first rope-branch and the second rope-branch at said branching position is branched off from the main rope segment,
wherein the first rope-branch comprises a noosed first rope-branch portion for making a noosed connection with a thickened rope portion;
and wherein the second rope-branch comprises a thickened second rope-branch portion for making a noosed connection with a noosed rope portion.

21. The method according to claim 20, wherein the rope is obtained from a first rope, which comprises said noosed first rope-branch portion, and a second rope, which comprises said thickened first rope-branch portion, and wherein the method further comprises:
splicing an end portion of a first main rope segment of the first rope into an intermediate portion of a second main rope segment of the second rope, or
splicing an end portion of a second main rope segment of the second rope into an intermediate portion of a first main rope segment of the first rope.

22. The method according to claim 20, wherein:
the rope comprises a first plurality of strands and a second plurality of strands,
each strand of said first plurality of strands is extending continuously at least from within the main rope segment to within the first rope-branch,
said first plurality of strands is at least partially forming said noosed first rope-branch portion,
each strand of said second plurality of strands is extending continuously at least from within the main rope segment to within the second rope-branch, and
said second plurality of strands is at least partially forming said thickened second rope-branch portion.

23. The method according to claim 20, wherein an attainable maximum first effective length of the first rope-branch is higher than 105% of an attainable maximum second effective length of the second rope-branch.

24. The method according to claim 20, wherein said attainable maximum first effective length is higher than 110% of said attainable maximum second effective length.

25. The method according to claim 20, wherein an attainable maximum second effective length of the second rope-branch is higher than 105% of an attainable maximum first effective length of the first rope-branch.

26. The method according to claim 20, wherein said attainable maximum second effective length is higher than 110% of said attainable maximum first effective length.

27. An assembly of:
a rope, wherein the rope along a longitudinal rope direction of the rope towards a longitudinal rope end of the rope successively comprises at least a main rope segment, a branching position and an end connector segment, wherein the end connector segment comprises a first rope-branch and a second rope-branch, wherein each of the first rope-branch and the second rope-branch at said branching position is branched off from the main rope segment, wherein the first rope-branch comprises a thickened first rope-branch portion, and wherein the second rope-branch comprises a thickened second rope-branch portion; and
a further rope having two noosed rope portions at its two opposite ends, respectively;
wherein the thickened first rope-branch portion of the rope and one of the two noosed rope portions of the further rope are configured for making a noosed connection with one another,
and wherein the thickened second rope-branch portion of the rope and the other of the two noosed rope portions of the further rope are configured for making a noosed connection with one another.

28. Use of the assembly according to claim 27, wherein:
a noosed connection is made between the thickened first rope-branch portion of the rope and one of the two noosed rope portions of the further rope; and/or
a noosed connection is made between the thickened second rope-branch portion of the rope and the other of the two noosed rope portions of the further rope.

29. An assembly of:
a rope, wherein the rope along a longitudinal rope direction of the rope towards a longitudinal rope end of the rope successively comprises at least a main rope segment, a branching position and an end connector segment, wherein the end connector segment comprises a first rope-branch and a second rope-branch, wherein each of the first rope-branch and the second rope-branch at said branching position is branched off from the main rope segment, wherein the first rope-branch comprises a noosed first rope-branch portion, and wherein the second rope-branch comprises a noosed second rope-branch portion; and
a further rope having two thickened rope portions at its two opposite ends, respectively;
wherein the noosed first rope-branch portion of the rope and one of the two thickened rope portions of the further rope are configured for making a noosed connection with one another,
and wherein the noosed second rope-branch portion of the rope and the other of the two thickened rope portions of the further rope are configured for making a noosed connection with one another.

30. Use of the assembly according to claim 29, wherein:
a noosed connection is made between the noosed first rope-branch portion of the rope and one of the two thickened rope portions of the further rope; and/or
a noosed connection is made between the noosed second rope-branch portion of the rope and the other of the two thickened rope portions of the further rope.

* * * * *